July 12, 1932.  C. T. RAULE  1,866,724
STEERING KNUCKLE BEARING
Filed May 21, 1929
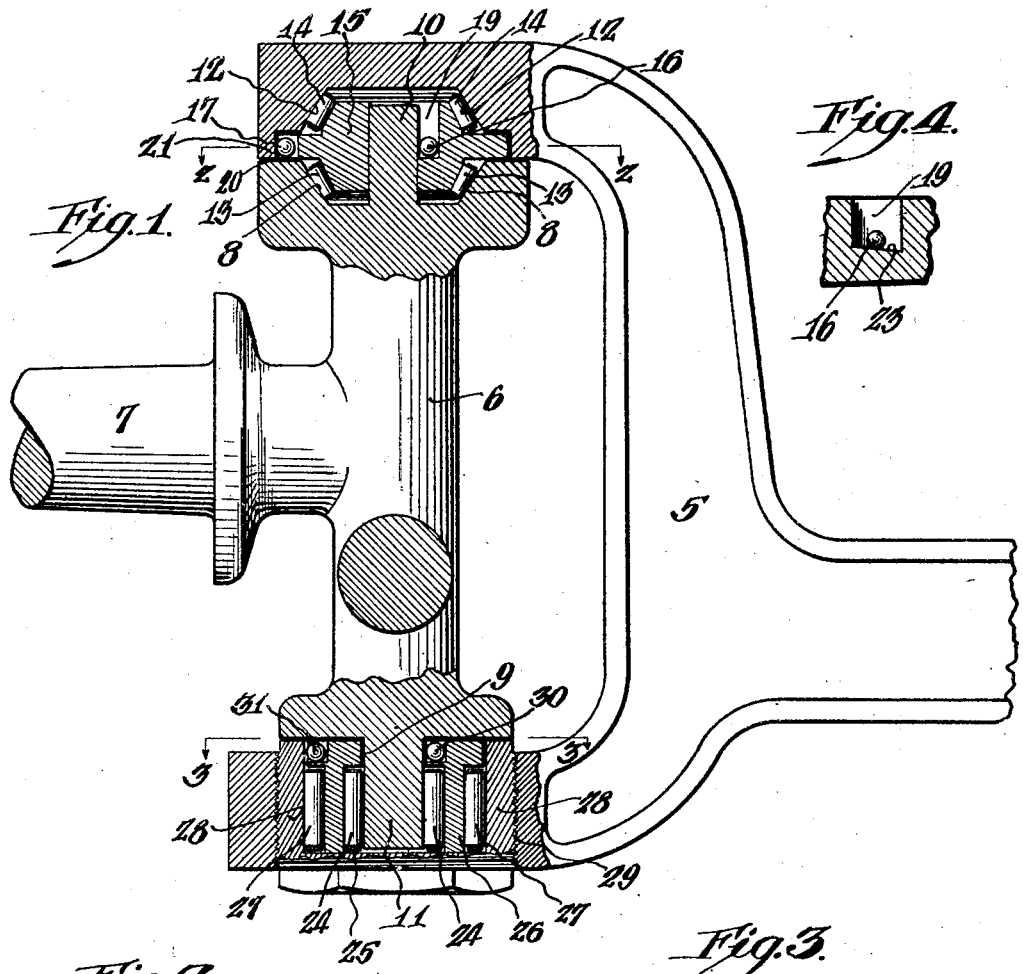
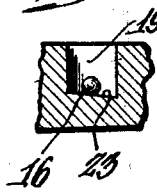
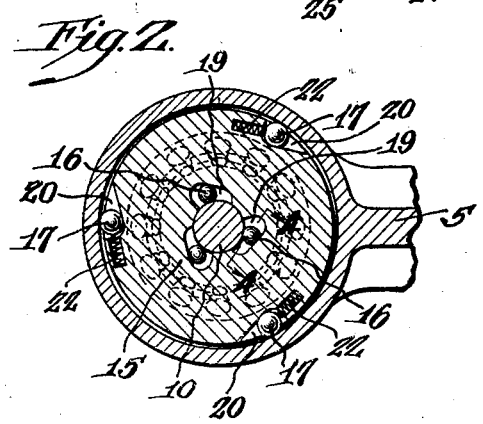
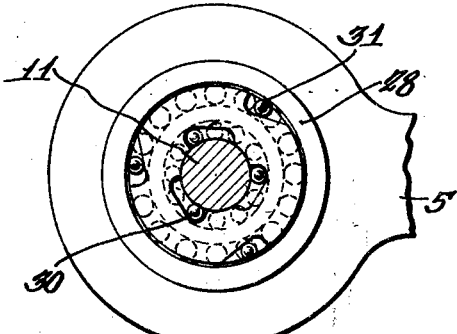
Inventor
Clifford T. Raule
by
Attorney Patented July 12, 1932

1,866,724

UNITED STATES PATENT OFFICE

CLIFFORD T. RAULE, OF BROOKLINE, PENNSYLVANIA

STEERING KNUCKLE BEARING

Application filed May 21, 1929. Serial No. 364,928.

My invention relates to the knuckle steering gear of an automobile or the like with particular reference to the roller bearings thereof.

A purpose of my invention is to prevent the rollers of a bearing of the character indicated from registering over and over again at the same positions during the same angular positions of the knuckle and particularly during the position of the knuckle corresponding to straight ahead travel of the car.

A further purpose is to provide a floating annular bearing between coaxial bearings respectively upon the wheel axle and knuckle member of an automobile, providing inner and outer sets of rollers upon the inner and outer bearing surfaces of the floating member, the two sets of rollers being supported respectively against the bearings presented by the knuckle and by the wheel axle.

A further purpose is to permanently shift the positions of the rollers of a roller bearing of a knuckle steering gear every time the knuckle member is angularly reciprocated out of and back into its normal position.

A further purpose is to give a ratchet movement to a floating bearing member that is supported between two sets of rollers that are in turn supported upon coaxial bearing surfaces respectively presented by the wheel axle and knuckle, using the angular reciprocations of the knuckle incident to steering the automobile to operate the ratchet progression of the floating bearing member.

Further purposes will appear in the specification and in the claims.

I have elected to show one only of the different forms of my invention, selecting a form that is practical and efficient in operation and which well illustrates the principles involved.

Figure 1 is a fragmentary elevation partly sectioned showing knuckle gear mechanism embodying a desirable form of my invention.

Figure 2 is a section taken upon the line 2—2 of Figure 1.

Figure 3 is a section taken upon the line 3—3 of Figure 1.

Figure 4 is a detail section taken upon the line 4—4 of Figure 2.

Like numerals refer to like parts in all figures.

Describing in illustration and not in limitation and referring to the drawing:—

In the past roller bearings on the knuckle steering members of automobiles have usually been subject to deterioration incident to the roller members wearing seat depressions in one or both of the opposing runway surfaces presented by the front axle member and steering knuckle member, either or both.

I have discovered that this trouble has been incident to the engaging positions of the rollers upon the runway surfaces being usually the same for the same angular positions of the runway surfaces with respect to one another.

Most of the time cars go straight ahead so that most of the time the rollers have occupied the same position with respect to the upper and lower runways, wearing depressions or seats in the opposing runways at the roller positions corresponding to straight ahead running of the car.

My invention is directed to providing means for changing the positions of the rollers with respect to the bearing surfaces presented by the roller runways carried by the wheel axle and by the knuckle member in such a way that the positions of the rollers on the roller runways shall no longer be the same for the same angular positions of the runways with respect to one another but shall be for each roller variant around the runways for all angular positions of the runways with respect to one another.

In the illustrations the front wheel axle 5 which is rigidly fastened to the car chassis carries a knuckle member 6 which represents a front wheel spindle 7 and is connected in the usual way to steering mechanism and to a corresponding knuckle upon the other end of the axle 5. The steering knuckle at the other end of the axle 5 is a counterpart to the member 6 except in so far as one of the knuckle members only is connected to the steering mechanism, and is therefore not shown.

I show the steering knuckle 6 as an integral member preferably of hardened alloy steel, presenting upper and lower bearing surfaces 8 and 9 and spindle projections 10 and 11 at the pivotal axis of the knuckle.

The wheel axle is provided with a downwardly directed conical bearing surface 12 to receive rollers of the upper bearings.

I provide two sets of rollers at the upper bearing, a lower set 13 and an upper set 14 and provide an intermediate runway or bearing member 15 which presents a lower conical surface to the lower rollers 13 and an upper conical surface to the upper rollers 14.

The intermediate floating runway member 15 fits loosely around the upwardly projecting spindle portion 10 of the knuckle 6 and preferably is provided with a ball ratchet connection at 16 with the knuckle member and at 17 with the axle member so that every time the knuckle is angularly reciprocated, incident to steering the car to make a turn, with respect to the axle member the ratchet connections will angularly shift the position of the intermediate runway member, thereby shifting the positions of the rollers with respect to all three runways.

The form of ratchet connection between the floating bearing member and the axle and knuckle members may obviously widely vary.

In the illustration, I have notched the outside and inside of the intermediate floating runway, at 19 and 20, to receive the inner and outer walls 16 and 17 for engagement respectively with the spindle projection of the knuckle and with the inwardly directed surface presented by the flange 21 of the axle but obviously can place the ball at each connection in either member according to preference.

I show the outer balls held to their engagement duty by small springs 22 suitably seated in the body of the floating member 15 and the inner balls maintained in operating positions by gravity, the bottoms 23 of the notches 19 being sloped as shown in Figure 4 so that the balls roll into simultaneous engagement with the opposing surfaces presented by the floating member and the knuckle.

The weight of the car comes upon the knuckle member at the upper bearing and I have therefore provided a form of bearing at the upper end of the knuckle that is well adapted to take this weight, as well as adapted to support the heavy lateral stresses to which the bearing will be subjected.

At the lower end of the knuckle the stresses upon the bearing surfaces are limited to those needed to resist lateral deflection of the knuckle member.

While normally the stresses are much greater at the upper bearing than at the lower bearing due to the fact that the upper bearing has to support the weight of the car, the lateral stresses upon both the lower and upper bearings are during high speed of the car heavy and variant and I find it desirable to protect the lower bearing as well as the upper from long continued engagements of the rollers at definite positions on the runways presented by the knuckle and axle respectively.

I desirably make the lower bearing comprise the downward spindle projection 11, an inner set of rollers 24, suitably spaced by a spacer member 25, a floating runway 26 surrounding the inner rollers, an outer set of rollers 27 around the intermediate floating runway member and an upwardly directed cup member 28 presenting an outer runway to the rollers 27 and threaded at 29 into the lower arm of the axle.

I show the runway surfaces vertical cylinders coaxial with pivotal axis of the knuckle and provide ball ratchet connections from the floating runway member 26 to the downwardly projecting spindle 11 at 30 and to the cup member 28 at 31.

Every time the driver of the car turns a corner he angularly reciprocates the steering knuckle.

This reciprocation by means of my invention changes the position of the rollers in both the upper and lower bearings with respect to all of the runway surfaces so that each roller is shifted to progressively engage all points of each of its runways and has no opportunity to wear the runways more in one place than in another.

It will be understood that hitherto the rollers have themselves presented the same portions of their surfaces to their runways during straightway running of the car and that as a result the rollers have worn out of round at the same time that the runway surfaces have worn away, thus effecting a rapid and material deterioration of the roller bearings.

I have preferred to introduce a ratchet connection between the floating member intermediate the runways presented respectively by the axle and knuckle members but optionally may omit this ratchet connection, for in practice the introduction of a floating runway member between the runways presented by the axle and knuckle will change the position of the rollers with respect to the runways so that definite angular positions of the knuckle no longer can give definite positions of the rollers with respect to the runway surfaces.

It is thus evident that part of the advantages of my invention are obtained without the use of the ratchet connection for definitely shifting the angular position of the intermediate runway member during every reciprocation of the steering knuckle.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. A bearing for a knuckle steering gear including a knuckle member and a wheel axle, a runway on the knuckle member, a second runway coaxial therewith on the wheel axle member, sets of rollers on the respective runways, a floating bearing intermediate the sets of rollers presenting cooperating runways to the respective sets of rollers, a check effective between the axle and the floating bearing to prevent movement in one direction, allowing movement in the opposite direction and a second check between the floating bearing and the knuckle member preventing movement in the direction allowed by the first check and allowing movement in the direction prevented by the first check.

2. A bearing for a knuckle steering gear including a knuckle member and a wheel axle, a runway on the knuckle member, a runway coaxial therewith on the axle member, a set of rollers upon the axle runway and a second set of rollers upon the knuckle runway in combination with a floating bearing member between the sets of rollers presenting runways to the respective sets of rollers and means for shifting the angular position of the intermediate bearing member when the knuckle member is angularly deflected in one direction.

3. A bearing for a knuckle steering gear including a knuckle member and a wheel axle, a runway on the knuckle member, a runway on the axle member coaxial therewith, a set of rollers upon the axle runway and a second set of rollers upon the knuckle runway in combination with a floating bearing member presenting runways to the respective sets of rollers and means for limiting angular movement of the floating bearing member with respect to the knuckle member to one direction, the floating bearing member being adapted to move in the same angular direction with respect to the wheel axle.

4. A bearing for a knuckle steering gear including a knuckle member and a wheel axle, a runway on the knuckle member, a runway on the axle member coaxial therewith, a set of rollers upon the axle runway and a second set of rollers upon the knuckle runway in combination with a floating bearing member presenting runways to the respective sets of rollers and ball ratchet means for shifting the angular position of the intermediate bearing member whenever the knuckle member is angularly reciprocated in one direction.

5. In a roller bearing of a knuckle steering gear of an automobile or the like, reversely sloping coaxial conical runways respectively upon the axle member and steering knuckle member at the top, and an intermediate bearing member presenting runway surfaces toward the said other runways and two sets of rollers between the runways of the intermediate member and upon the runways presented by the axle and knuckle gear respectively.

6. In a roller bearing of a knuckle steering gear of an automobile or the like, reversely sloping coaxial conical runways respectively upon the axle member and the steering member at the top thereof, an upwardly extending spindle from the steering knuckle coaxial with the runways, a floating runway member intermediate the said other conical runways, surrounding the spindle extension of the knuckle and presenting reversely sloping conical runways toward the said other runways, two sets of roller bearings supported between the runways of the floating member and the runways respectively of the axle and knuckle member and ball ratchet connection between the floating member and the spindle and between the floating member and the wheel axle member.

7. In a roller bearing of a knuckle steering gear of an automobile or the like, a lower bearing connection between the knuckle and the axle including a downwardly extending spindle from the knuckle, a set of rollers around the spindle, a floating cylindrical runway around the rollers, a second set of rollers around the floating runway member, a runway supported by the axle around the outer set of rollers and opposed checks between floating runway and knuckle and axle respectively, each checking movement in one direction and preventing movement in the opposite direction and each permitting movement in the direction checked by the other.

8. In a lower roller bearing of a knuckle steering gear of an automobile or the like, a downwardly extending spindle from the knuckle, an inner set of rollers around the spindle, a cylindrical runway around the rollers of the inner set, an outer set of rollers around the cylindrical runway, an outer runway around the rollers of the outer set rigid with the axle and ratchet means for making angular reciprocation of the knuckle with respect to the axle effect an angular shifting of the position of the floating runway member.

9. In the bearings of a knuckle steering gear, an axle member, a steering knuckle member and bearings between the axle member and steering knuckle member, one of the bearings comprising a thrust bearing having runways in both the knuckle member and steering member, a floating intermediate member having runways adapted to cooperate with each of the said runways in the axle member and steering knuckle member and rolling members within the runways forming two complete bearings, one between the axle member and the floating member and the other between the floating member and the steering knuckle member.

10. In the bearings of a knuckle steering gear, an axle member, a steering knuckle member and bearings between the axle member and steering knuckle member, one of the bearings comprising a thrust bearing having runways in both the knuckle member and steering member, a floating intermediate member having runways adapted to cooperate with each of the said runways in the axle member and steering knuckle member, rolling members within the runways forming two complete bearings, one between the axle member and the floating member and the other between the floating member and the steering knuckle member, and uni-directional clutch means between the floating member and the axle member causing the floating member to turn in the same direction with successive movements of the axle member in that direction.

11. In the bearings of a knuckle steering gear, an axle member, a steering knuckle member and bearings between the axle member and steering knuckle member, one of the bearings comprising a thrust bearing having runways in both the knuckle member and steering knuckle member, a floating intermediate member having runways adapted to cooperate with each of the said runways in the axle member and steering knuckle member, rolling members within the runways forming two complete bearings, one between the axle member and the floating member and the other between the floating member and the steering knuckle member and clutch means between the floating member and the axle and steering knuckle members respectively causing the floating member to turn in one direction with successive actuations of the axle member in that direction and to hold the floating member against reverse movement.

12. In the bearings of a knuckle steering gear, an axle member, a steering knuckle member and bearings between the axle member and steering knuckle member, one of the bearings comprising a lateral thrust bearing including runways rigidly connected with the axle member and steering knuckle member, a floating member in between having runways cooperating with the said runways, rolling members between the runways to complete the bearing and opposed checks between the floating member and the axle member and knuckle member respectively, each preventing movement in one direction and allowing movement in the direction checked by the other.

13. In the bearings of a knuckle steering gear, an axle member, a steering knuckle member and bearings between the axle member and steering knuckle member, one of the bearings comprising a lateral thrust bearing including runways rigidly connected with the axle member and steering knuckle member, a floating member in between having runways cooperating with the said runways, rolling members between the runways to complete the bearing and clutch means for causing movement of the floating member in one direction with movement of the axle member in that direction.

14. In the bearings of a knuckle steering gear, an axle member, a steering knuckle member and bearings between the axle member and steering knuckle member, one of the bearings comprising a lateral thrust bearing including runways rigidly connected with the axle member and steering knuckle member, a floating member in between having runways cooperating with the said runways, rolling members between the runways to complete the bearing and clutch means between the floating member and the axle member and steering knuckle member respectively providing unidirectional movement of the floating member with movement of the axle member and holding the floating member against reverse direction of movement.

CLIFFORD T. RAULE.